Sept. 27, 1955  H. N. STEPHAN  2,718,819
HORIZONTAL BORING, DRILLING AND MILLING MACHINE
Filed Jan. 19, 1949  5 Sheets-Sheet 1

INVENTOR.
HALLIS N. STEPHAN
BY Hudson, Boughton,
Williams, David & Hoffmann.
ATTORNEYS Sept. 27, 1955     H. N. STEPHAN     2,718,819
HORIZONTAL BORING, DRILLING AND MILLING MACHINE
Filed Jan. 19, 1949     5 Sheets-Sheet 2

INVENTOR.
HALLIS N. STEPHAN
BY Hudson, Boughton,
Williams, David & Hoffmann.
ATTORNEYS Sept. 27, 1955 H. N. STEPHAN 2,718,819
HORIZONTAL BORING, DRILLING AND MILLING MACHINE
Filed Jan. 19, 1949 5 Sheets-Sheet 4

INVENTOR.
HALLIS N. STEPHAN
BY Hudson, Boughton,
Williams, David & Hoffmann.
ATTORNEYS Sept. 27, 1955  H. N. STEPHAN  2,718,819
HORIZONTAL BORING, DRILLING AND MILLING MACHINE
Filed Jan. 19, 1949  5 Sheets-Sheet 5

INVENTOR.
HALLIS N. STEPHAN
BY Hudson, Boughton,
Williams, David & Hoffmann.
ATTORNEYS United States Patent Office 2,718,819
Patented Sept. 27, 1955

2,718,819
HORIZONTAL BORING, DRILLING, AND MILLING MACHINE

Hallis N. Stephan, Cleveland Heights, Ohio, assignor to The New Britain Machine Company, New Britain, Conn., a corporation of Connecticut Application January 19, 1949, Serial No. 71,624

7 Claims. (Cl. 90—13.5)

The present invention relates to machine tools and, more particularly, to combined horizontal boring, drilling and milling machines.

The principal object of the invention is the provision of a novel and improved, combined horizontal boring, drilling and milling machine comprising a manually operable means for controlling the movements of the various machine tool elements thereof, such as, the spindle head, saddle, column, etc., and detachable mechanism in the nature of an attachment for automatically controlling the operations or movements of the machine tool elements thereof from a pattern, thus enabling the machine to be manufactured, sold and used as a conventional combined horizontal boring, drilling and milling machine or a pattern controlled machine, as desired.

The invention resides in certain novel constructions and combinations and arrangements of parts and further objects and advantages will be apparent to those skilled in the art to which it relates from the following description of the preferred embodiment described with reference to the accompanying drawings forming a part of this specification in which similar reference characters designate corresponding parts, and in which.

Figure 1:
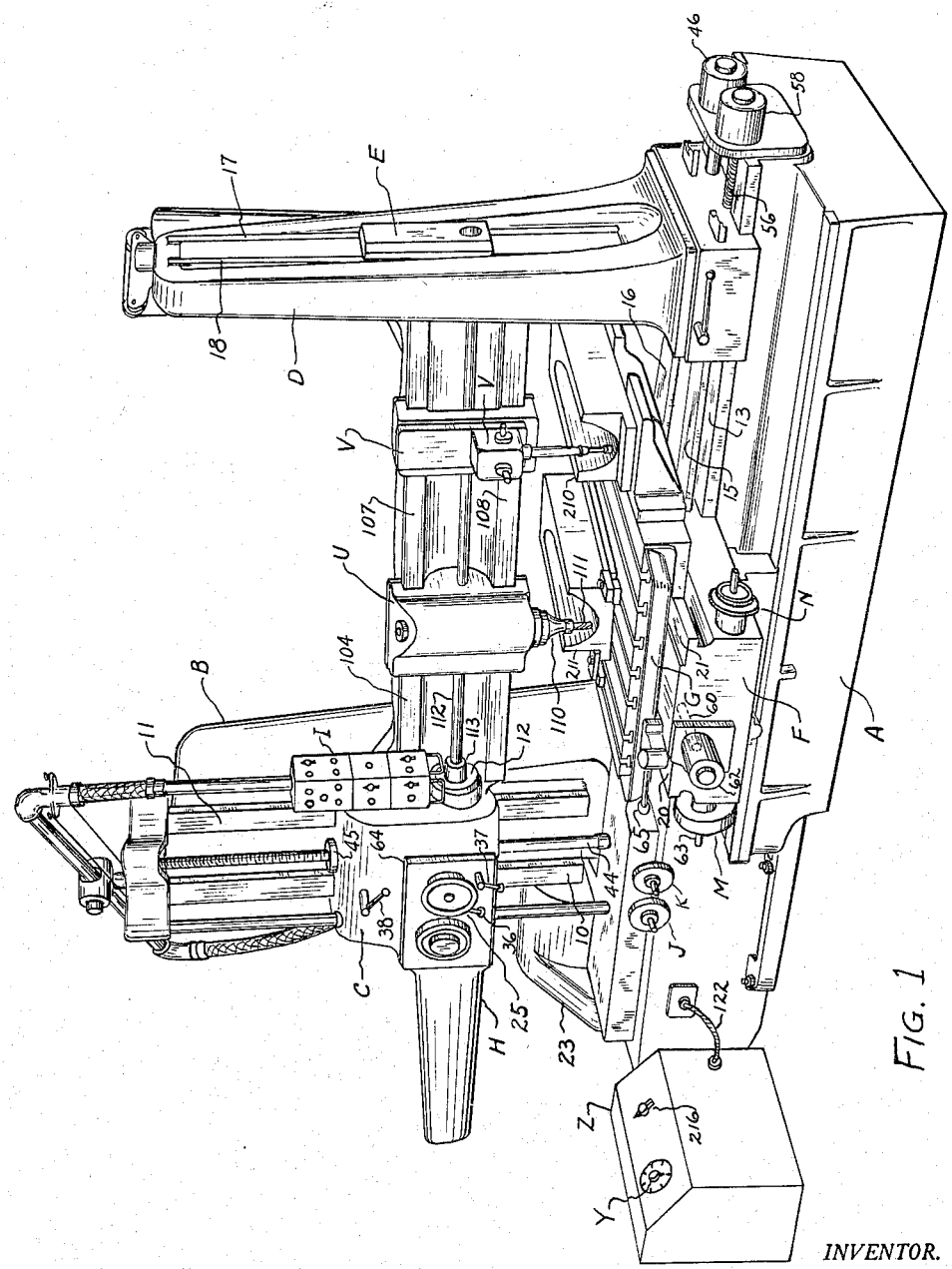
Fig. 1 is a perspective view of a combined horizontal boring, drilling and milling machine embodying the present invention.
Figure 2:
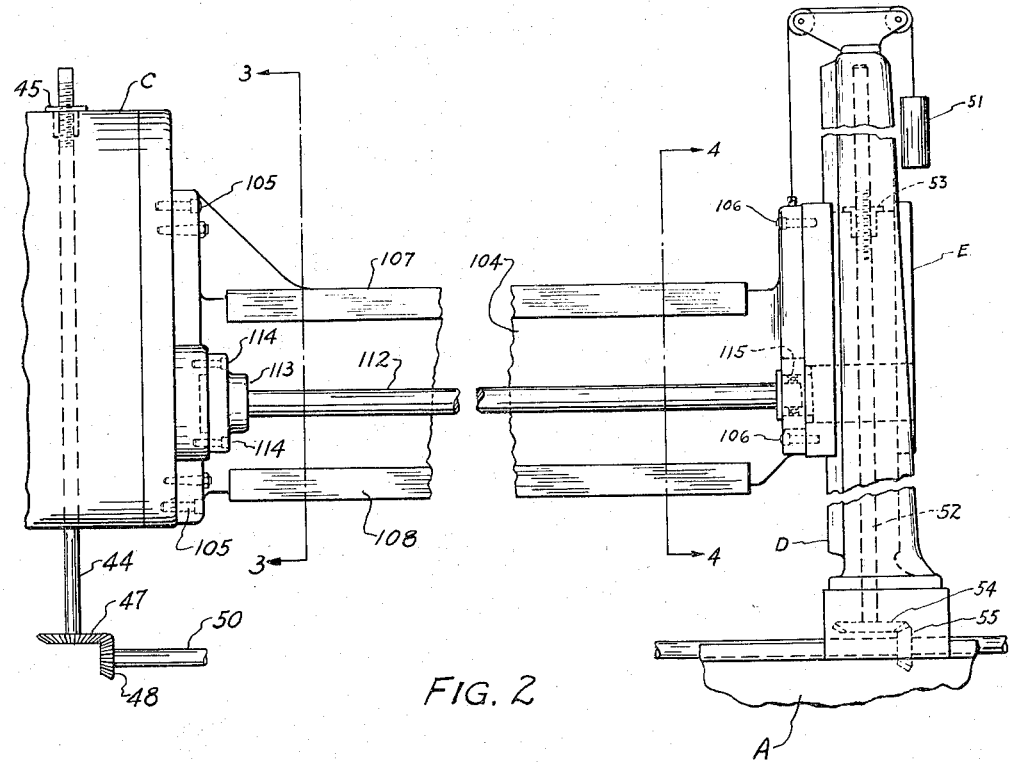
Fig. 2 is an enlarged, fragmentary, front elevational view of a portion of Fig. 1.
Figure 3:
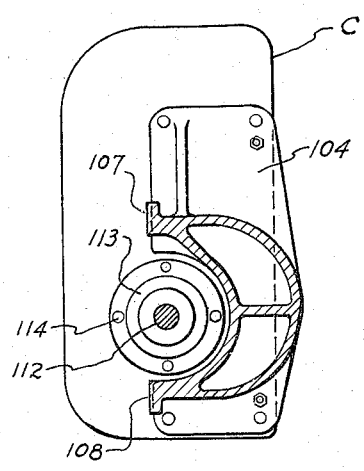
Fig. 3 is a view approximately on the line 3—3 of Fig. 2.
Figure 4:
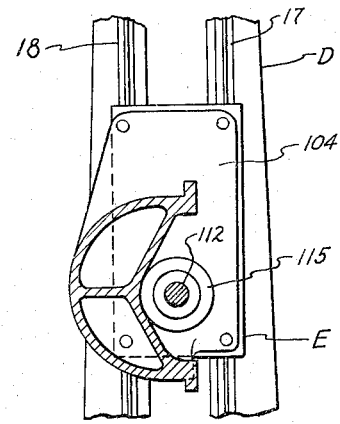
Fig. 4 is a view approximately on the line 4—4 of Fig. 2.
Figure 5:
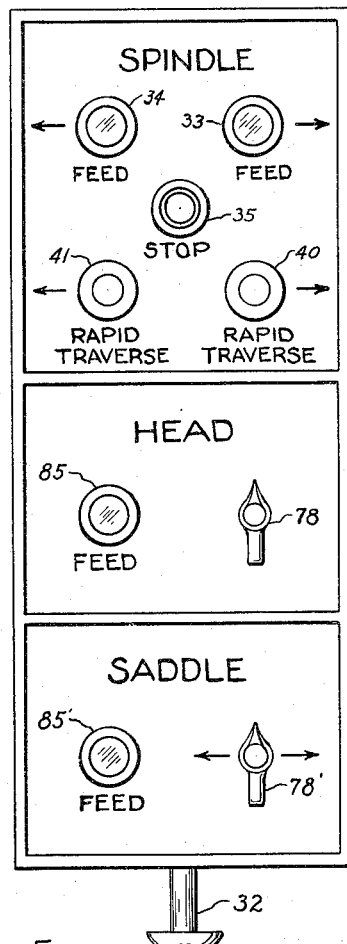
Fig. 5 is an enlarged, front view of the pendant control station.
Figure 6:
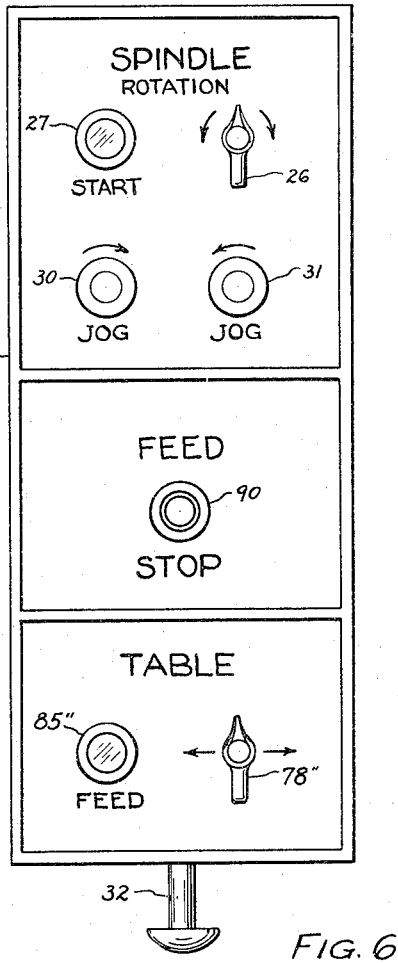
Fig. 6 is an enlarged, side view of the pendant control station.
Figure 7:
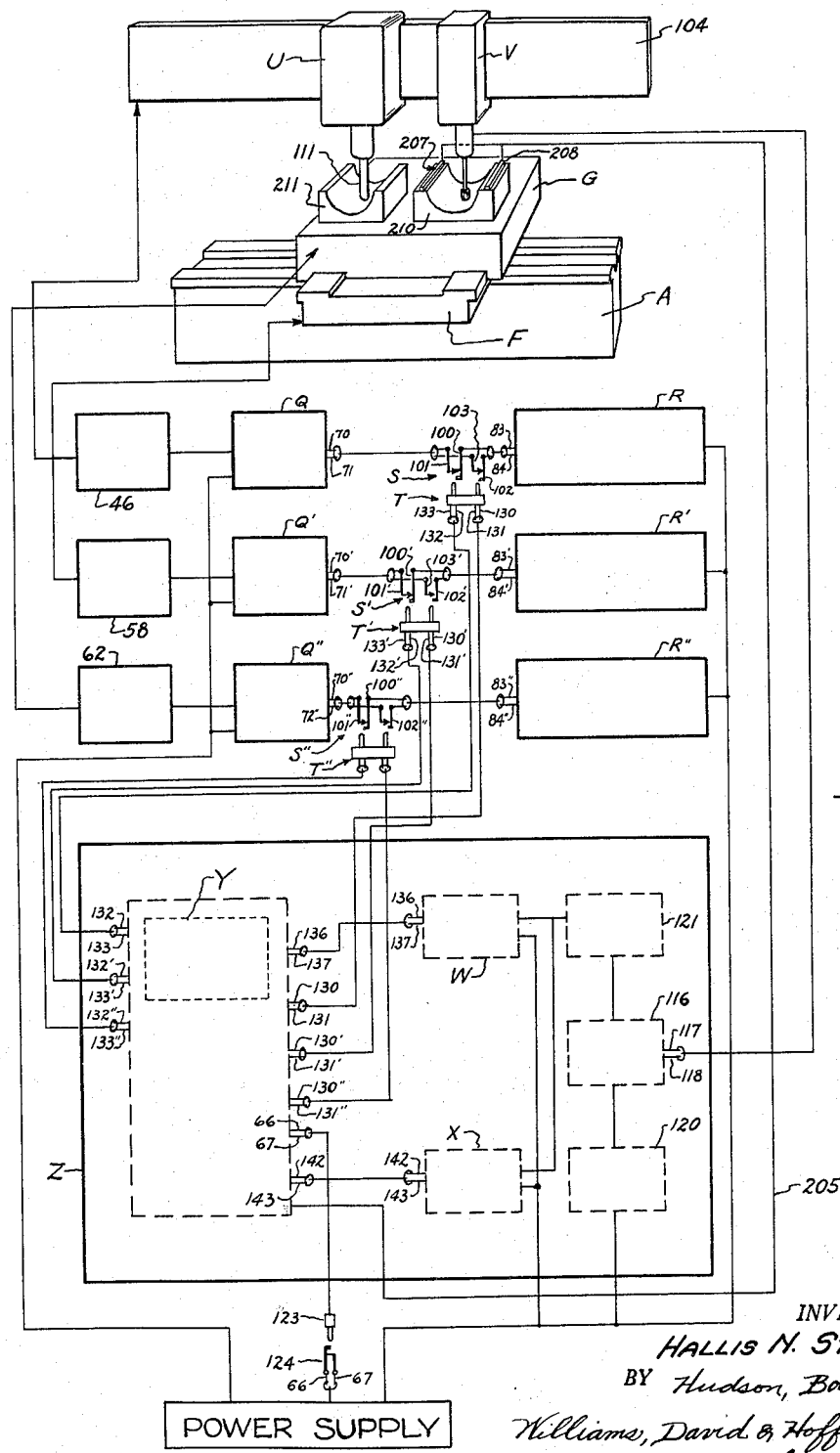
Fig. 7 is a diagrammatic view of the electrical control system.
Figure 8:
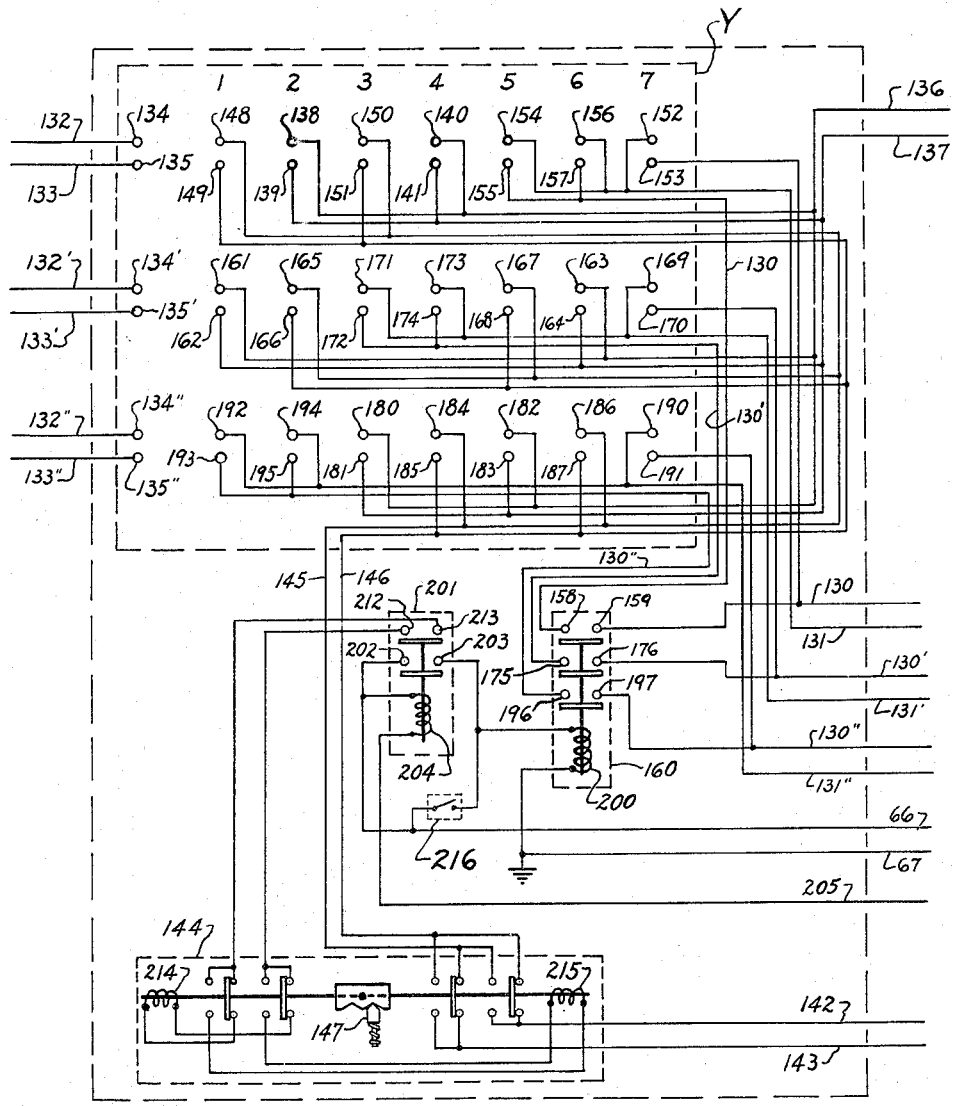
Fig. 8 is a schematic wiring diagram of a portion of the control mechanism.
Figure 9:
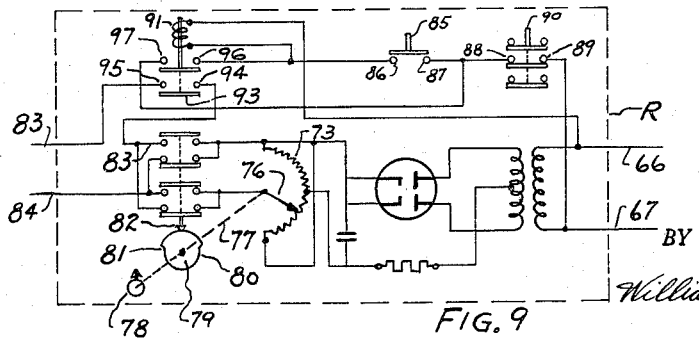
Fig. 9 is a schematic wiring diagram of one of the manual control circuits forming a part of the control mechanism.

While the invention is susceptible of various modifications and alternative constructions, it is particularly applicable to and is herein shown and described as embodied in a combined horizontal boring, drilling and milling machine of the general character shown in United States Patent No. 2,350,174, issued May 30, 1944.

As shown in the drawings, the machine comprises a rectangular-shaped base A provided at one end with a vertical spindle head column B having ways 10, 11 on its front face upon which a spindle head C provided with a generally horizontal spindle 12 is mounted for vertical movement and at the other end with a vertical backrest or outboard support column D slidably supported for movement toward and from the spindle head column B on the horizontal main ways 13, 14 on the upper side of the bed A and underneath guards 15, 16 therefor. The backrest column D is provided with vertical ways 17, 18 upon which a backrest block E is mounted for vertical movement. In addition to the outboard support column D, the bed ways 13, 14 support a saddle F having on its upper side transversely extending, horizontal ways 20, 21 which, in turn, support a work table G.

The spindle 12 is rotated in opposite directions and moved in opposite directions lengthwise of its axis of rotation at different speeds to effect different feeding movements by a reversible, variable speed, spindle drive or main motor housed within the bed A of the machine underneath the guard 23. The spindle is adapted to be rapid traversed in opposite directions by a reversible, electric motor carried on the spindle head. The spindle 12 may be manually moved in either direction by a hand wheel 25 fixed to the front end of a transversely extending shaft rotatably supported in the spindle head and operatively connected to the spindle feed mechanism. The position of the spindle with respect to some reference point on the machine or the spindle head is indicated by a dial mechanism H including a full travel dial. The construction of this part of the machine is preferably similar to that shown in my copending application Serial No. 764,819, filed July 30, 1947, now Patent No. 2,632,365, issued March 24, 1953, to which reference is made for a more complete disclosure.

Since the construction of the spindle driving, feeding and rapid traversing mechanisms per se do not form a part of the present invention, they will not be herein described in detail. They may be similar to that shown in the aforesaid patent but the spindle drive motor is preferably a motor similar to the head, saddle and table feed motors hereinafter referred to, and is preferably manually controlled in a manner similar to that in which the feed motors are manually controlled. In this event, the speed change gearing P shown in the aforesaid patent is omitted and a reversing potentiometer speed control of the character hereinafter described, including a potentiometer control knob 26 and a single "start" push button switch 27, substituted for the "continuous right" and "continuous left" push button switches of said patent. The spindle drive motor can be rotated in opposite directions to effect continuous rotation of the spindle in the direction indicated by the arrows, adjacent to the potentiometer control knob 26 on the pendant I, depending upon the setting of the potentiometer control knob, by instantaneous actuation of the spindle rotation "start" push button switch 27, both of which controls are located on the right-hand face of the pendant, which face is always at right angles to the axis of the spindle. The spindle may be jogged in either direction, as indicated by actuation of the "jog" push button switches 30, 31. When rotation of the spindle is initiated by actuation of the spindle "start" push button switch 27, rotation thereof can be stopped by pushing the "stop all" push button switch 32 projecting from the bottom of the pendant or one of the spindle "jog" push button switches 30, 31. The feed movement of the spindle is initiated by instantaneous actuation of one or the other of the illuminated continuous "feed" push button switches 33, 34 located on the front face of the pendant. The right-hand switch 33 initiates feed movement toward the right and the left-hand switch 34 toward the left. After a feed movement has been started, it may be stopped at any time by depressing the "stop all" push button switch 32 or the spindle feed "stop" push button switch 35. The rate of feed relative to the speed of rotation of the spindle is determined by the setting of the manually operable, gear shift levers 36, 37 on the spindle head C.

The spindle can be rapid traversed in opposite directions by depressing one or the other of the "traverse" push button switches 40, 41 located below the continuous "feed" push button switches 33, 34. The right-hand switch 40 causes the spindle to move to the right and the left-hand switch 41 to the left. The spindle will be traversed in the direction indicated as long as the push button switch is held depressed. The construction and operation of the machine thus far referred to are similar to that shown in the aforesaid patent, with the exceptions mentioned.

The spindle head C, which is counterbalanced, is moved vertically along the spindle head column ways 10, 11 by a lead screw 44 rotatably supported in the frame of the machine and secured therein against longitudinal movement, which lead screw has threaded engagement with a nut 45 located within and carried by the spindle head C. The lead screw 44 is adapted to be rotated in opposite directions by a reversible, variable speed, spindle head feed motor 46 bolted to the right-hand end of the bed A of the machine, see Fig. 1. The lower end of the screw 44 is provided with a bevel gear 47 continuously in mesh with a bevel pinion 48 fixed to the left-hand end of a horizontal shaft 50 extending longitudinally of the bed A and rotatably supported therein. The shaft 50 extends to the right-hand end of the bed where it is permanently connected to the rotor of the head feed motor 46.

The backrest or outboard support E which is preferably also counterbalanced by a weight 51 is moved vertically along the backrest column ways 17, 18 simultaneously with the vertical movement of the spindle head C along the spindle head column ways 10, 11 by a vertical lead screw 52 located within the backrest column D and rotatably supported thereby against longitudinal movement, which lead screw has threaded engagement with a nut 53 located within the backrest block E. The lead screw 52 is operatively connected to the drive or mechanism for rotating the spindle head lead screw 44 by a bevel gear 54 keyed to the lower end of the lead screw 52 and in mesh with a bevel pinion 55 splined to the right-hand end of the shaft 50. From the foregoing it will be understood that the spindle head C and the backrest block E will be simultaneously moved vertically along their respective columns upon energization of the spindle head feed motor 46. The reference character J designates a dial mechanism for indicating the position of the spindle head C and backrest block E and for permitting movement of the same by hand. This mechanism is similar in construction and operation to the corresponding dial mechanism shown in my aforesaid copending application.

The saddle F is adapted to be moved longitudinally of the tool spindle 12 along the bed ways 13, 14 by a longitudinally extending lead screw 56 rotatably supported in the bed and held therein against longitudinal movement. The lead screw 56 has threaded engagement with a nut fixed in the saddle F. The right-hand end of the lead screw 56 is permanently connected to the rotor of a reversible, variable speed, saddle feed motor 58 bolted to the right-hand end of the bed A. The left-hand end of the lead screw 56 is operatively connected to a dial mechanism K similar to the dial mechanism J and the construction shown in my aforesaid application.

The table G is adapted to be reciprocated transversely of the tool spindle 12 along the ways 20, 21 by a lead screw 60 rotatably supported in the saddle F and held therein against longitudinal movement. The lead screw 60 has threaded engagement with a nut located within and fixed to the table G. A reversible, variable speed, table feed electric motor 62 is affixed to the front of the saddle F and has its rotor directly connected to the lead screw 60.

The saddle F is provided with two dial mechanisms M, N similar to the dial mechanisms previously referred to for indicating the position of the table relative to a reference point on the saddle or some other part of the machine. The dial mechanisms M, N are located at opposite sides of the saddle and the respective elements thereof are supported coaxially with a longitudinally extending shaft 63 rotatably supported in the saddle and connected to the lead screw 60 in a manner similar to the construction shown in my aforesaid application.

The spindle head and backrest block, table, saddle, and backrest column are preferably provided with clamps and operating mechanisms therefor similar to that shown in either the aforesaid patent or application and are not herein shown and described in detail other than to say that the control levers for the spindle head and backrest block and the table clamps are shown and designated on the drawings by the reference characters 64, 65, respectively.

After the gear shift levers 36, 37 and the back gear lever 38 have been set in the desired positions, the remaining operations of the machine are controlled from the pendant control station I supported for universal movement in a manner similar to that in which the pendant control station of the aforesaid patent is supported. The spindle head C and backrest block E which move as a unit, the saddle F and the table G can be selectively moved in either direction at the desired speed by proper manipulation of the manual control devices located on the pendant station I which control the actuation of, the direction of rotation, and the speed of the feed motors 46, 58 and 62, respectively, connected thereto. The feed motors 46, 58, 62 are alike as is the manual control mechanism for initiating and controlling their operation and only the spindle head feed motor 46 and its control mechanism will be described in detail. The corresponding parts of the control mechanism for the other motors, where shown, are indicated by the same reference characters but having a prime mark affixed thereto in the case of the saddle feed motor 58 and a double prime mark affixed thereto in the case of the table feed motor 62.

For purposes of simplification, the spindle head feed motor 46 shown is similar to that shown in Kuehni et al. United States Patent No. 2,410,295, issued October 29, 1946, as are many other parts of the control mechanism herein shown and alternating current power is supplied thereto in a similar manner by the wires 66, 67. The motor 46 operates at a speed in a direction which is proportional to the magnitude and polarity of the voltage applied to the input control circuit comprising the wires 70, 71 of a motor control mechanism, designated generally as Q, which is similar to the motor control mechanism shown in said Patent No. 2,410,295 and which wires correspond to the input control circuit shown entering the boxes of the said Patent No. 2,410,295 adjacent to the top of the boxes, one of which boxes is indicated in Fig. 1 of said Patent No. 2,410,295 by the reference character 92. Voltage is applied to the circuit comprising the wires 70, 71 for manual control of the operation of motor 46 by a manual control, designated generally as R, including a potentiometer resistor 73 located in the pendant control station to which direct current is supplied by a full wave rectifier from the alternating current supply comprising the wires 66, 67. Opposite ends of the potentiometer resistance 73 are connected to one side of the output of the rectifier and the center of the resistance to the other side. The potentiometer includes a slider 76 connected to a shaft 77 projecting through the front panel of the pedant station I where it is provided with a control knob 78. The shaft 77 is provided with a cam 79 having two radially offset, arcuate cam surfaces 80, 81 connected by a steeep rise. The cam faces or surfaces 80, 81 are so constructed and operatively connected to a double pole, double throw switch 82 that the polarity of the output circuit consisting of the wires 83, 84 will be reversed as the potentiometer slider 76 passes the center point of the potentiometer resistance 73. The construction is such that when the potentiometer slider is in contact with the center of the potentiometer resistance, zero voltage is applied to the output circuit 83, 84 and as the potentiometer slider is moved in either direction, an increasing voltage is applied thereto, the polarity of which will depend upon the direction in which the control knob 78 and in turn the potentiometer slider is moved. The output circuit 83, 84 of the manual control R is connected to the input circuit 70, 71 of the motor control mechanism in a manner hereinafter described and since the polarity applied to the control circuit 70, 71 controls the direction in which the motor 46 rotates, it follows that the motor can be rotated in opposite directions by merely rotating the potentiometer control knob 78 in the desired manner.

In order to permit stopping and starting of the motor 46 without changing the potentiometer setting and, in turn, the speed adjustment, a head "feed" push button switch 85 is provided. The normally open contacts 86, 87 of the head "feed" push button switch 85 are in series circuit with a pair of normally closed contacts 88, 89 of a "stop" feed push button switch 90 common to the three feed motors 46, 58, 62 and an operating solenoid 91 of a relay 93 having two pairs of normally open contacts 94, 95 and 96, 97, the former of which is connected in series circuit in the control wire 83 of the output circuit of the manual control R and the latter of which complete a holding circuit for maintaining the operating solenoid 91 of relay 93 energized after the head "feed" start push button switch 85 has been depressed and released until the "stop" push button switch 90 or the "stop all" push button switch 32 is depressed.

The output circuit or, in other words, the wires 83, 84 of the manual control R are normally connected to the input circuit, that is, the wires 70, 71 of the motor control Q through a double circuit jack, designated generally as S, and which may be of any sutiable commercal construction. Normally the contacts 100, 101 of the jack S are closed to connect the wire 83 to the wire 70 and the contacts 102, 103 are closed to connect the wire 84 to the wire 71. The function of the double plug T, when inserted into the jack S, will be hereinafter referred to.

The machine thus far described is a more or less conventional combined horizontal boring, drilling and milling machine of the type shown in the aforesaid Patent No. 2,350,174. The spindle can be rotated in opposite directions at selected speeds, and the spindle, spindle head, saddle, and table can be fed or traversed, as desired, by proper manipulation of the controls on the pendant control station I. The usual overtravel limit switches have not been shown but may be employed, if desired.

In addition to being operable or usuable in the ordinary manner, the combined horizontal boring, drilling and milling machine of the present invention can be operated as a pattern controlled machine by connecting thereto suitable tracer or follower mechanism in the form of an attachment. The mechanism may be connected with or disconnected from the machine, as desired, and comprises a rail 104 detachably connected to and carried by the spindle head C and the backrest block E, as by the screws 105, 106, respectively. The rail 104 has a pair of ways 107, 108 formed on its front face, which ways carry a tool head U and a tracer head V adjustably secured to the ways. The tool head U is provided with a vertical tool spindle 110 adapted to detachably carry a suitable metal cutting tool 111. The tool spindle 110 is supported in suitable bearings and is driven from the spindle 12 through a splined shaft 112 to which the tool spindle 110 is connected by suitable gearing. The end of the shaft 112 adjacent to the spindle 12 is provided with a collar 113 detachably connected to the end of the spindle 12 as by screws 114. The opposite end of the splined shaft 112 is rotatably supported in a bearing 115 in the backrest block E from which it can be readily detached.

The tracer head V may be of any desired construction. The particular tracer head shown, except for its mounting on the rail 104, is similar to that shown in the aforesaid Patent No. 2,410,295 and will not be herein described in detail. Suffice it to say that the tracer head V is connected to the bridge 116 corresponding to the bridge shown in said Patent No. 2,410,295 by wires 117, 118 corresponding to wires 36, 37 of the patent. The reference character 120 designates an oscillator similar to the oscillator of said Patent No. 2,410,295 and connected to the bridge 116 in a similar manner. The signal or control voltage from the bridge 116 is amplified by an amplifier 121 similar to the amplifier of said Patent No. 2,410,295 and fed to cosine and sine regulators W, X respectively similar to the cosine and sine regulators of said Patent No. 2,410,295. The cosine and sine regulators W, X are adapted to be selectively connected to the motor controls Q, Q', Q'' in place of the manual controls R, R', R'' by a multi-position, drum controller Y to connect the machine to one which is pattern controlled.

The bridge 116, oscillator 120, amplifier 121, cosine regulator W, sine regulator X, and the drum controller Y are all housed in or form a part of a control cabinet Z adapted to be located adjacent to the machine proper and detachably connected thereto by a flexible cable 122, the free end of which contains the plugs T, T', T'' and a single plug 123 adapted to be connected to a jack 124 for supplying alternating current to the control cabinet. The jacks S, S', S'' and 124 are all grouped together at the left hand end of the machine near the floor and the construction is preferably such that the plug can be simultaneously inserted therein as a unit. The tracer head V is permanently wired to the control cabinet by the wires 117, 118 previously referred to.

When the plugs on the end of this flexible cable 122 are connected to their respective jacks, alternating current is supplied to the control cabinet Z through the plug and jacks 123, 124. The output circuit 83, 84 of the manual control R is disconnected from the input circuit 70, 71 of the motor control Q and connected to the wires 130, 131 leading to the control cabinet Z. The input circuit 70, 71 of the motor control Q is connected to the wires 132, 133 also leading to the control cabinet Z when they are connected to a pair of stationary contacts 134, 135 of the drum controller Y. The manual controls R', R'' and the motor controls Q', Q'' are connected to the control cabinet Z in the same manner.

The drum of the drum controller Y has seven positions numbered 1 to 7 in the drawings and each position has three separate pairs of contacts adapted to be connected to the three separate pairs of stationary contacts 134, 135 and 134', 135' and 134'', 135''. As shown the output circuit of the cosine regulator, which circuit consists of the wires 136, 137, is connected to pairs of contacts 138, 139 and 140, 141 in the second and fourth positions of the drum controller and which pairs of contacts are adapted to be connected to the stationary pair of contacts 134, 135 to place the head feed motor 46 under the control of the cosine regulator W. The output circuit of the sine regulator, which circuit comprises the wires 142, 143, is connected through a multiple, double pole, double throw, solenoid operated reversing switch 144 to wires 145, 146 which switch is always held in one or the other of its closed positions by a spring loaded detent 147. The wires 145, 146 are connected to the pairs of contacts 148, 149 and 150, 151 in the first and third positions of the drum controller Y.

The pair of contacts 148, 149 and 150, 151 are adapted to be selectively connected to the stationary contacts 134, 135 to place the head feed motor 46 under the control of the sine regulator X. The pair of contacts 152, 153 located in the seventh position and which contacts are adapted to be selectively connected to the stationary contacts 134, 135 are connected to the wires 130, 131, which wires are in turn connected to the output circuit 83, 84 of the manual control R for the head feed motor 46 when the plug T is assembled in the jack S.

The remaining two pairs of contacts 154, 155 and 156, 157 adapted to be selectively connected to the stationary contacts 134, 135 and which pairs of contacts 154, 155 and 156, 157 are located in the fifth and sixth positions of the drum controller are connected in parallel circuit with the wires 130, 131 which, as previously stated, are connected to the output circuit 83, 84 of the manual control R for the head feed motor 46 through a pair of normally open contacts 158, 159 of a time delay relay 160 located in the control cabinet Z which contacts 158, 159 are so connected in the wire 130 as not to interfere with its connection to the contact 153 of the drum controller Y.

Of the contacts on the drum controller Y adapted to be selectively connected to the stationary contacts 134', 135' connected to the wires 132', 133', which wires are adapted to be connected through the jack and plug S', T', and the wires 70', 71', to the motor control Q' for the saddle feed motor 58, the pairs of contacts 161, 162 and 163, 164 located in the first and sixth positions are connected to the cosine regulator W in a manner similar to that in which the pairs of contacts 138, 139 and 140, 141 are connected thereto. In a similar manner, the pairs of contacts 165, 166 and 167, 168 are connected to the wires 142, 143 by the wires 145, 146 and the multiple, double pole, double throw switch 144 and in turn are connected to the sine regulator X. In this instance, the pair of contacts 169, 170 is connected to the wires 130', 131', which wires are in turn connected to the manual control R' for the saddle feed motor 58 through the jack and plug S', T'.

The remaining two pairs of contacts 171, 172 and 173, 174 adapted to be selectively connected to the stationary contacts 134', 135' and which pairs of contacts 171, 172 and 173, 174 are located in the third and fourth positions of the drum controller are connected in parallel circuit with the wires 130', 131' which, as previously stated, are connected to the output circuit of the manual control R' for the saddle feed motor 58 through a pair of normally open contacts 175, 176 of the time delay relay 160. The contacts 175, 176 are located in the wire 130' in such a manner that they do not interfere with its connection to the contact 170.

In addition to the pairs of contacts previously referred to, the drum controller Y comprises seven pairs of contacts adapted to be selectively connected to the stationary contacts 134'', 135'' connected to the wires 132'', 133'', which wires are in turn connected through the jack and plug S'', T'' to the motor control Q'', which control in turn is associated with the table feed motor 62. Of these pairs of contacts, the pairs 180, 181 and 182, 183 located in the third and fifth positions are connected to the wires 136, 137 forming the output circuit of the cosine regulator W; the pairs 184, 185 and 186, 187 are connected to the wires 142, 143 forming the output circuit of the sine regulator X by the wires 145, 146 and the multiple, double pole, double throw switch 144; the pair 190, 191 is connected to the wires 130'', 131'', which wires are in turn connected through the jack and plug S'', T'' to the manual control R'' for the table feed motor 62; and the pairs of contacts 192, 193 and 194, 195 are connected in parallel circuit with the wires 130'', 131'' which, as previously stated, are connected to the output circuit of the manual control R'' for the table feed motor 46 through a pair of normally open contacts 196, 197 of the time delay relay 160, which contacts are so connected to the wire 130'' so as not to interfere with its connection to the contact 191.

The operating solenoid 200 of the time delay relay 160 is adapted to be periodically energized to close the normally open contacts thereof by a relay 201, the normally open contacts 202, 203 of which are in series circuit with the operating solenoid 200 across the alternating current source or supply comprising the wires 66, 67. The wire 67 of the alternating current supply is grounded and the wire 66 is connected to one side of the operating solenoid 204 of the relay 201. The opposite end of the operating solenoid 204 of relay 201 is connected by a wire 205 connected to two strips of conducting material 207, 208 fixed to the pattern 210 with which the tracing head V of the tracing or follower mechanism cooperates. The pattern 210 is fixedly connected to the work table G as is the work 211.

In the embodiment shown, with the drum controller Y in the No. 2 position the machine is so set up that the saddle moves the work and pattern in a direction parallel to the axis of rotation of the spindle 12 and the spindle head and backrest block move the rail 104 and in turn the tool and tracer heads U and V vertically under the control of the pattern and tracer head and the cosine and sine regulators respectively. When the drum controller Y is turned to its No. 5 position the table feed motor 62 is under the control of the cosine regulator and the saddle feed motor 58 is under the control of the sine regulator. The other pair of contacts 194, 195 in the second position is connected to the control Q'' for the table motor 62 and to the manual control R'' for the table motor through the time delay relay 160. The head and saddle feed motors 46, 58 are operated in predetermined relation, as clearly explained in the aforesaid Patent No. 2,410,295, to cause the tracer control to follow the pattern as the saddle is moved either toward the left or the right. When the tracer head contacts one or the other of the insulated strips 207, 208 at opposite sides of the pattern proper, it completes the circuit to ground through the operating solenoid 204 of relay 201 which in turn energizes the time delay relay 160 causing the table feed motor 62 to operate in a direction and at a speed depending upon the setting of the potentiometer control knob 78'', the start push button switch 85'' for the table control having previously been depressed to close the contacts 94, 95 of relay 93. The operation of the time delay relay 160 and in turn the actuation of the table feed motor 62 causes the table to be moved a predetermined distance a right angles to the axis of rotation of the spindle 12 and thus position the tracer head V and tool 111 for the next cut.

Simultaneously with the closing of the contacts 202, 203 of relay 201 to move the table G a short distance transversely of the axis of the spindle 12, normally open contacts 212, 213 of the same relay 201 are closed to reverse the polarity of the potential applied to the wires 145, 146 and in turn the direction of rotation of the saddle feed motor 58 and the direction in which the saddle is moved. For this purpose the contacts 212, 213 are connected in series circuit with one or the other of the operating solenoids 214, 215 of the reversing switch 144 through a second set of double pole, double throw switch contacts. The construction is such that upon each energization of the operating solenoid 204 of relay 201 and the closing of the normally open contacts 212, 213 thereof, the reversing switch 144 is reversed changing the polarity of the potential applied by the sine regulator X to the saddle feed motor control Q' and the direction in which the saddle feed motor will operate. Simultaneously the reversing switch 144 connects the opposite operating solenoid thereof with the contacts 212, 213 so that the switch will reverse upon the next closing of the contacts.

The present invention also contemplates the manual control of the feed movement other than the movements under the control of the sine and cosine regulators so that an irregular path or contour may be followed; for example, a switch 216 may be provided to short circuit or shunt the contacts 202, 203 of relay 201, thus maintaining the operating solenoid 200 of relay 160 energized, in which event, with the drum controller Y in the second position, as previously described, the table feed motor 62 can be manually controlled by the potentiometer knob 78'' to cause the table to move forward or backward underneath the tool and tracer head simultaneously with the movement of the spindle head C and saddle F under the control of the tracer and the cosine and sine regulators. In this manner the tool could be made to follow an irregular, horizontal path rather than the straight or linear path previously referred to.

From the foregoing it will be apparent that when the selector switch Y is positioned with its pairs of contacts in the seventh position in engagement with the stationary contacts 134, 135, 134', 135' and 134", 135", the wires 132, 133; 132', 133'; and 132", 133" will be connected to the output circuits 130, 131; 130', 131', and 130", 131" of the the manual controls R, R' and R" for the head, saddle and table motors. The head, saddle and feed motors 46, 58 and 62 can be operated by the manual controls including the potentiometer control knobs 78, 78' and 78" and the feed start push button switches 85, 85' and 85" located on the pendant control station I. When the drum controller Y is located in any of its other six positions, two of the feed motors will be connected to the cosine and sine regulators and the third to its respective manual control through the time delay relay 160, etc. With the six positions shown, any combination desired can be obtained by properly positioning the drum controller. It will also be apparent that by removing the rail 104 and the mechanism associated therewith and disconnecting the flexible cable 122 from the machine, the pattern control attachment is entirely disconnected and the machine again converted to one operable as a conventional horizontal boring, drilling and milling machine, the various movements of the machine tool elements of which are under the control of the control devices located on the pendant control station I.

From the foregoing description of the preferred embodiment of the invention, it will be apparent that there has been provided a novel end improved, combined horizontal boring, drilling and milling machine which may be operated either as an ordinary combined horizontal boring, drilling and milling machine or as a pattern controlled machine. While the preferred embodiment of the invention has been described with considerable detail, the invention is not limited to the particular construction shown; for example, the outboard support may be omitted and the tool and tracer heads detachably connected to the spindle head alone. Alternatively, the pattern may be bolted directly to the table rather than being carried by a member fixed to the table, as shown in Fig. 1. It will also be apparent that the tool spindle and tracer head may be located in a horizontal plane and, if desired, one may be located above the other. The rail or detachable member which carries the tool and tracer head may be omitted altogether and the tracer head directly connected to the spindle head in which event the tool may be directly connected to the horizontal spindle 12. It is further to be understood that one or more of the machine tool elements, such as, the table or saddle may be omitted, if desired, and that a feed mechanism similar to that employed for moving either the spindle head, saddle or table may be substituted for the spindle feed shown. Obviously, the tracer or follower control may be constructed as an integral part of the machine, if desired. It is my intention to cover hereby all adaptations, modifications and uses thereof which come within the practice of those skilled in the art to which the invention relates and within the scope of the appended claims.

Having thus described my invention, I claim:

1. In a machine tool having two machine tool elements movable relative to each other in three linear paths at right angles to one another, a reversible first power actuated means for effecting relative movement between said machine tool elements in one of said paths, a reversible second power actuated means for effecting relative movement between said machine tool elements in another of said paths, a third power actuated means for effecting relative movement between said machine tool elements in the third of said paths, a tracer or follower mechanism operatively connected for movement with one of said machine tool elements, a pattern operatively connected for movement with the other of said machine tool elements, means actuated by the relative position between said tracer or follower, and said pattern for automatically controlling the speed of operation of said first power actuated means and the speed and direction of operation of said second power actuated means, and means actuated by the relative position between said tracer or follower and said pattern for automatically reversing the direction of operation of said first power actuated means and for operating said third power actuated means upon said tracer or follower mechanism and said pattern reaching a predetermined relative position incident to operation of said first power actuated means.

2. In a machine tool having two machine tool elements movable relative to each other in three linear paths at right angles to one another, a reversible first power actuated means for effecting relative movement between said machine tool elements in one of said paths, a reversible second power actuated means for effecting relative movement between said machine tool elements in another of said paths, a third power actuated means for effecting relative movement between said machine tool elements in the third of said paths, manual control means operatively connected to said machine for controlling the operation of said power actuated means whereby said machine tool elements may be moved in said paths, control means including a tracer or follower mechanism adapted to be operatively connected for movement with one of said machine tool elements and for cooperation with a pattern operatively connected for movement with the other of said machine tool elements and actuated by the position of the tracer or follower relative to the pattern for automatically controlling the operation of a plurality of said power actuated means, and means for detachably connecting said control means to said machine and simultaneously rendering said manual control means inoperative, said control means also including a manually operable member for selectively rendering said manual control means operative and the tracer or follower mechanism inoperative.

3. In a machine tool having two machine tool elements movable relative to each other in three linear paths at right angles to one another, a reversible variable speed first power actuated means for effecting relative movement between said machine tool elements in one of said paths, a reversible variable speed second power actuated means for effecting relative movement between said machine tool elements in another of said paths, a third power actuated means for effecting relative movement between said machine tool elements in the third of said paths, manual control means operatively connected to said machine for controlling the operation of said power actuated means whereby said machine tool elements may be moved selectively in said paths, a tracer or follower mechanism detachably connected to said machine for movement with one of said machine tool elements, a pattern detachably connected to said machine for movement with the other of said machine tool elements, means actuated by the position of the tracer or follower relative to the pattern for automatically controlling the speed of operation of said first reversible power actuated means and the direction and speed of operation of said second reversible power actuated means, means actuated by the position of the tracer or follower relative to the pattern for automatically reversing the direction of operation of said first power actuated means and for operating said third actuated means upon said tracer or follower and said pattern reaching a predetermined position incident to operation of said first power actuated means, and means for detachably connecting both of said last-named means to said machine.

4. In a combined horizontal boring, drilling and milling machine comprising a frame including a base and a spindle head column, a spindle head member supported on said column for movement in a generally vertical plane, power actuated means for moving said spindle head member, a spindle member rotatably and slidably supported in said spindle head member, power actuated means for rotating said spindle member, power actuated means for reciprocating said spindle member axially, a slide member supported on said base for movement in a generally horizontal plane, power actuated means for moving said slide member, manual control means operatively connected to said machine controlling the operation of said power actuated means whereby said members may be moved selectively in opposite directions, a tracer or follower mechanism detachably connected to said machine for movement with one of said members, a pattern detachably connected to said machine for movement with another of said members, means for automatically controlling in response to the relative position between the tracer or follower and the pattern the speed of operation of said power actuated means for one of said members with which the tracer or follower and the pattern are connected and the direction and speed of operation of said power actuated means for the other member, means for automatically reversing the direction of operation of the first of said power actuated means for the members with which the tracer or follower and pattern are connected and operating a third of said power actuated means upon said tracer or follower and pattern reaching a predetermined position relative to each other incident to operation of the first of said power actuated means for the members with which the tracer or follower and pattern are connected, and means for detachably connecting both of said last-named means with said machine.

5. In a combined horizontal boring, drilling and milling machine comprising a frame including a base and a spindle head column, a spindle head member supported on said column for movement in a generally vertical plane, power actuated means for moving said spindle head member, a spindle member rotatably and slidably supported in said spindle head member, power actuated means for rotating said spindle member, power actuated means for reciprocating said spindle member axially, a slide member supported on said base for movement in a generally horizontal plane, power actuated means for moving said slide member, a second slide member supported on said slide member, power actuated means for moving said second slide member, manual control means operatively connected to said machine for controlling the operation of said power actuated means whereby said elements may be moved selectively in opposite directions, a tracer or follower mechanism detachably connected to said machine for movement with said head member, a pattern detachably connected to said machine for movement with said second slide member, means for automatically controlling in response to the reltaive position between the tracer or follower and the patern the speed of operation of said power actuated means for moving said head member and the direction and speed of operation of said power actuated means for said second slide member, means for automatically reversing the direction of operation of the first of said power actuated means for the members with which the tracer or follower and pattern are connected and operating a third of said power actuated means upon said tracer or follower and pattern reaching a predetermined position relative to each other incident to operation of the first of said power actuated means for the members with which the tracer or follower and pattern are connected, and means for detachably connecting both of said last-named means with said machine.

6. In a combined horizontal boring, drilling and milling machine comprising a frame including a base and a spindle head column, a spindle head member supported on said column for movement in a generally vertical plane, power actuated means for moving said spindle head member, a spindle member rotatably and slidably supported in said spindle head member, power actuated means for rotating said spindle member, power actuated means for reciprocating said spindle member axially, a slide member supported on said base for movement in a generally horizontal plane, power actuated means for moving said slide member, a second slide member supported on said slide member, power actuated means for moving said second slide member, manual control means operatively connected to said machine for controlling the operation of said power actuated means whereby said elements may be moved selectively in opposite directions, a tracer or follower mechanism detachably connected to said machine for movement with said spindle head member, a pattern detachably connected to said machine for movement with one of said slide members, means for automatically controlling in response to the relative position between the tracer or follower and the pattern the speed of operation of said power actuated means for said first slide member and the direction and speed of operation of said power actuated means for said spindle head member, means for automatically reversing the direction of operation of said power actuated means for said first slide member and operating said power actuated means for said second slide member upon said tracer or follower and pattern reaching a predetermined position relative to each other incident to operation of said power actuated means for said first slide member, and means for detachably connecting both of said last-named means with said machine.

7. In a combined horizontal boring, drilling and milling machine comprising a frame including a base and a spindle head column, a spindle head member supported on said column for movement in a generally vertical plane, power actuated means for moving said spindle head member, a spindle member rotatably and slidably supported in said spindle head member, power actuated means for rotating said spindle member, power actuated means for reciprocating said spindle member axially, a slide member supported on said base for movement in a generally horizontal plane, power actuated means for moving said slide member, a second slide member supported on said slide member, power actuated means for moving said second slide member, manual control means operatively connected to said machine for controlling the operation of said power actuated means whereby said elements may be moved selectively in opposite directions, a member adapted to be detachably connected to said head member, a tracer or follower head mechanism movably connected to said last-named member, a pattern detachably connected to said machine for movement with one of said slide members, means for automatically controlling in response to the relative position between the tracer or follower and the pattern the speed of operation of said power actuated means for one of said slide members with which the pattern is connected and the direction and speed of operation of said power actuated means for the other of said slide members, means for automatically reversing the direction of operation of the first of said power actuated means for said slide member and operating the other of said power actuated means for said slide members upon said tracer or follower and pattern reaching a predetermined position relative to each other incident to operation of the first of said power actuated means for said slide members, said two last-named means being located in a cabinet, and means for detachably connecting said cabinet with said machine.

References Cited in the file of this patent

UNITED STATES PATENTS

| | | |
|---|---|---|
| 2,029,335 | Oberhoffken | Feb. 4, 1936 |
| 2,242,406 | Stewart | May 20, 1941 |
| 2,262,473 | Stewart | Nov. 11, 1941 |
| 2,332,532 | Roehm | Oct. 26, 1943 |
| 2,334,956 | Ridgway | Nov. 23, 1943 |
| 2,350,174 | Lucas | May 30, 1944 |
| 2,395,525 | Wilkie | Feb. 26, 1946 |
| 2,410,295 | Kuehni et al. | Oct. 29, 1946 |
| 2,447,201 | Miller | Aug. 17, 1948 |
| 2,511,956 | Wetzel | June 20, 1950 |
| 2,559,089 | Plimmer | July 3, 1951 |